United States Patent [19]
Hida et al.

[11] Patent Number: 5,531,525
[45] Date of Patent: Jul. 2, 1996

[54] SEALED BALL BEARING

[75] Inventors: Tadayoshi Hida; Yasutaka Ishida; Tohru Takamizawa, all of Kanagawa, Japan

[73] Assignee: NSK Ltd., Tokyo, Japan

[21] Appl. No.: 171,623

[22] Filed: Dec. 22, 1993

[30] Foreign Application Priority Data

Dec. 22, 1992 [JP] Japan .................. 4-092198 U

[51] Int. Cl.⁶ .................................................. F16C 33/78
[52] U.S. Cl. ................................................. 384/482
[58] Field of Search .................. 384/488, 482, 384/484, 147, 140, 141

[56] References Cited

FOREIGN PATENT DOCUMENTS

| | | |
|---|---|---|
| 49-140548 | 12/1974 | Japan . |
| 54-132045 | 10/1979 | Japan . |
| 1082704 | 9/1967 | United Kingdom . |
| 1261224 | 1/1972 | United Kingdom . |
| 2114682 | 8/1983 | United Kingdom . |
| 2165594 | 4/1986 | United Kingdom . |

*Primary Examiner*—Lenard A. Footland
*Attorney, Agent, or Firm*—Sughrue, Mion, Zinn, Macpeak & Seas

[57] ABSTRACT

A sealed ball bearing of the present invention is provided with an inner race having an inner raceway track, an outer race having an outer raceway track and being arranged so as to be concentric with the inner race, a plurality of balls arranged so as to be rollable between the inner and outer raceway tracks, holding grooves formed on edge portions of the outer race over an inner circumference of the outer race, and seal plates formed into annular shapes and held by the holding grooves, in which each of the seal plates includes a reinforcing plate and an elastic member bonded on one surface of the reinforcing plate, and the elastic member includes an elastic projection projected at an outer circumferential end portion thereof from an end portion of the reinforcing plate on the side of the outer race. The elastic projections are forced-into the respective holding grooves, so that the sealed ball bearing allows the seal plates to be supported on the inner race by the holding grooves without particularly complicating the shapes of or increasing the widths of the holding grooves and the elastic projections.

9 Claims, 4 Drawing Sheets

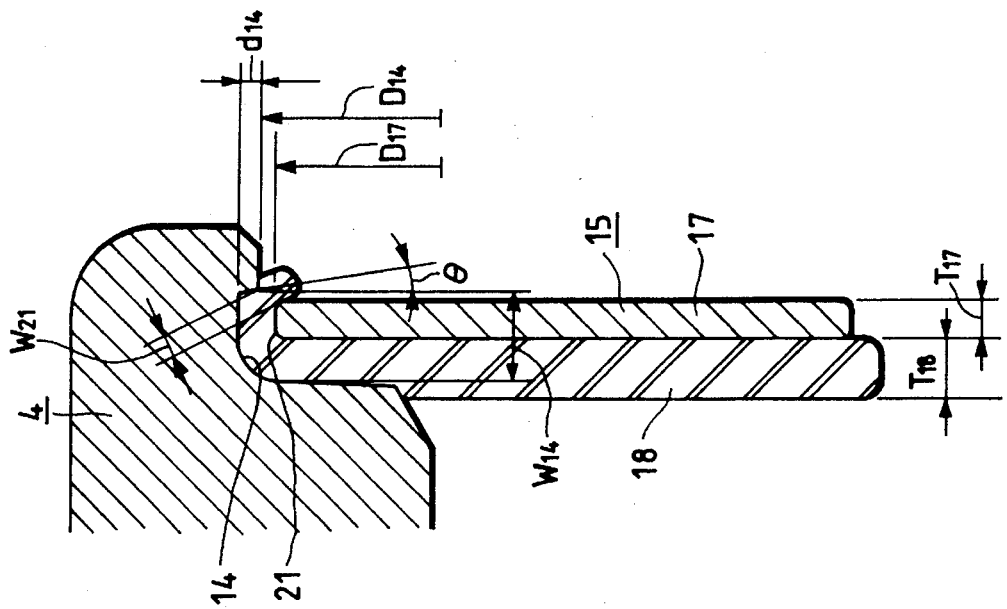
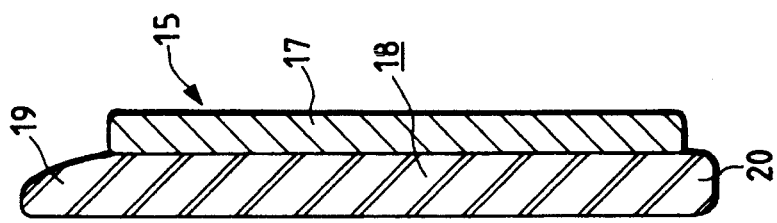
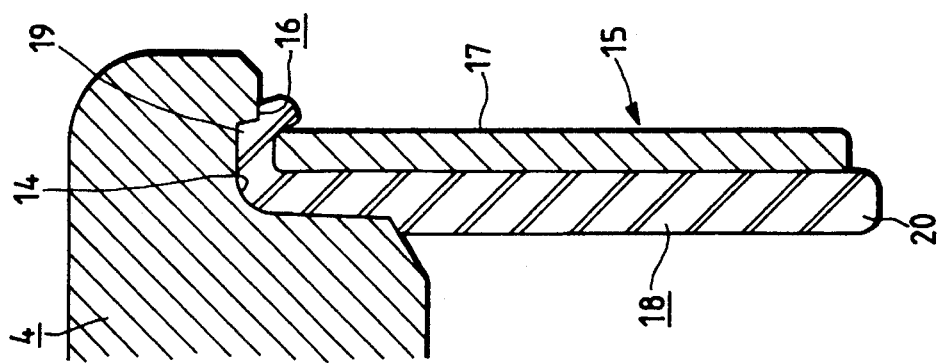

5,531,525

SEALED BALL BEARING

BACKGROUND OF THE INVENTION

The present invention relates to sealed ball bearings, and more particularly to a sealed ball bearing for supporting various rotary parts while incorporated into such equipment as computer devices and audio-visual devices.

A small ball bearing called a miniature bearing or an extra-small bearing is used for supporting a rotary part such as a capstan or the like of, e.g., an audio-vidual device. The ball bearing includes, as shown in FIG. 9, an inner race 2 having an inner raceway track 1 on an outer surface thereof; an outer race 4 having an outer raceway track 3 on an inner surface thereof and being arranged so as to be concentric with the inner race 2; and a plurality of balls 5 arranged so that the balls can roll easily between the inner raceway track 1 and the outer raceway track 3. The respective balls 5 are held by a cage 9 so as to be rollable.

At two positions of both edge portions on the inner surface of the outer race 4 are holding grooves 6, which are formed so as to extend over the circumference. An annular seal plates 7 are supported by the respective holding grooves 6. Each of the seal plates 7 includes: a reinforcing member 10 made of a plate material having sufficient rigidity such as stainless steel; and an elastic member 11 made of a material such as rubber or synesthetic resin. Both the inner and the outer circumferential end portions of the elastic member 11 are projected from both the inner and the outer circumferential end portions of the reinforcing plate 10, and support the seal plates 7 by both inner edge portions of the outer race 4 by engaging the outer circumferential projections with the holding grooves 6. Under this condition, the inner circumferential end portions of the elastic member 11 slidably contact with both edge portions on the outer surface of the inner race 2.

To attach the seal plates to the surface of the outer race or the inner race, the holding groove 6 and the circumferential end portion of the elastic member 11 are formed into predetermined shapes, and therefore the circumferential end portion is engaged with the holding groove 6 with sufficient strength, as disclosed in, e.g., Unexamined Japanese Utility Model Publication No. Sho. 49-140548. That is, as shown in FIG. 10, a circumferential end portion 12 of the elastic member 11 bonded onto the seal plate 7 can be freely pressed into the holding groove 6 by elastically deforming the circumferential end portion 12.

Moreover, the thus shaped seal plate 15 is formed by punching a plate blank that is formed by coating the elastic member 18 on a single surface of a metal plate forming the reinforcing plate 17 into an annular form as disclosed in Unexamined Japanese Patent Publication No. Sho. 54-132045.

However, to facilitate the attachment of the circumferential end portion 12 of the seal plate 7 to the holding groove 6 as well as to make the attached seal plate 7 hard to come off, the above-described conventional structure requires strict dimensional accuracy in forming the circumferential end portion 12 and the holding groove 6, thus making the sealed ball bearings costly.

To overcome this problem, a large width is required for the holding groove 6. Consequently, if the volume of a space 8 (FIG. 9) in which the balls 5 are arranged is to be reserved, the width of the sealed ball bearing must be increased. If such width is fixed, the volume of the space 8 becomes small. The reduction in the volume of the space 8 means, however, a reduction in the amount of grease to be charged into such space, which leads to a shortened life of the ball bearing.

SUMMARY OF THE INVENTION

A sealed ball bearing of the present invention has been made in view of the above circumstances.

The sealed ball bearing of the present invention includes in a manner similar to the conventional example: an inner race having an inner raceway track on the outer surface thereof; an outer race having an outer raceway track on the inner surface thereof and being arranged so as to be concentric with the inner race; a plurality of balls arranged so as to be rollable between the inner raceway track and the outer raceway track; and annular-shaped seal plates. One circumferential end portion of each seal plate is supported by one of an edge portion on the outer surface of the inner race and an edge portion on the inner surface of the outer race, and the other circumferential end portion thereof is arranged so as to be close to or so as to contact slidably with the other edge portion.

Particularly, in the sealed ball bearing of the present invention, a holding groove is formed over the circumference of the edge portion; each seal plate includes a reinforcing plate having sufficient rigidity and an elastic member bonded on one surface of the reinforcing plate; a circumferential end portion of the elastic member forms an elastic projection by being projected from at least one circumferential end portion of the reinforcing plate; and the seal plates are supported by the inner race or the outer race by forcing the elastic projections into the holding grooves.

The thus constructed sealed ball bearing of the present invention allows the seal plates to be supported by the holding grooves without particularly complicating the shape of or increasing the width of the holding groove and the elastic projection that is to be engaged with the holding groove.

Therefore, the manufacturing cost can be reduced. In addition, if the width of the sealed ball bearing is fixed, the sealed ball bearing can be downsized by increasing the volume of the ball arranging space to thereby allow the amount of grease charged into such space to be increased, or by decreasing the width of the sealed ball bearing if the volume of the space remains the same.

BRIEF DESCRIPTION OF THE DRAWINGS

In the accompanying drawings:

FIG. 1 is a partially enlarged sectional view of a sealed ball bearing of the present invention;

FIG. 2 is a sectional view of a seal plate;

FIG. 3 is a sectional view similar to FIG. 1 for explaining dimensions of parts;

DETAILED DESCRIPTION OF THE PREFERRED EMBODIMENTS

Figure 9:
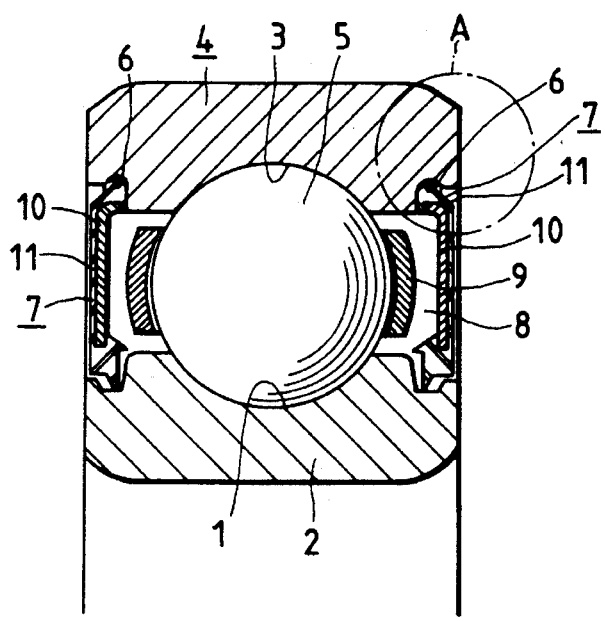
FIG. 9 is a partially sectional view showing an example of a conventional sealed ball bearing.
Figure 10:
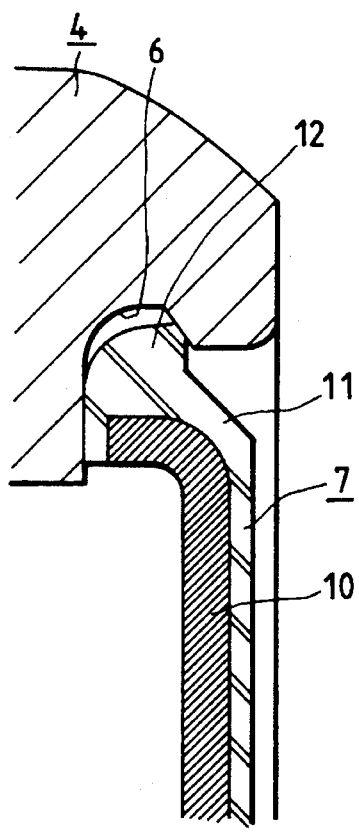
FIG. 10 is an enlarged sectional view of part A shown in FIG. 9.

As shown in FIG. 9, a sealed ball bearing of the present invention includes: an inner race 2 having an inner raceway track 1 on an outer surface thereof; an outer race 4 having an outer raceway track 3 on an inner surface thereof and being arranged so as to be concentric with the inner race 2; and a plurality of balls 5 arranged so as to be able to roll between the inner raceway track 1 and the outer raceway track 3 and held by a cage 9.

As shown in FIG. 1, with the sealed ball bearing of the present invention, a holding groove 14 is formed on an edge portion over the inner circumference of the outer race 4. A seal plate 15 is annularly shaped as a whole. An outer circumferential end portion of the seal plate 15 is held by the holding groove 14. A stepped portion 16 is formed on the edge portion of the inner surface of the outer race 4, whose internal diameter is made larger than a middle portion of the outer race 4. The holding groove 14 is placed toward the middle portion from the stepped portion 16.

As shown in FIG. 2, the seal plate 15 includes: a reinforcing plate 17 made of a metal having sufficient rigidity; and an elastic member 18 made from rubber, synthetic resin or the like and bonded on a single surface of the reinforcing plate 17. Both the inner and the outer circumferential end portions of the elastic member 18 are projected from both the inner and the outer circumferential end portions of the reinforcing plate 17, and form an outer circumferential elastic projection 19 and an inner circumferential elastic projection 20.

The thus shaped seal plate 15 is formed by punching a plate blank that is formed by coating the elastic member 18 on a single surface of a metal plate forming the reinforcing plate 17 into an annular form. The sizes of the outer and the inner circumferential elastic projections 19, 20 are adjusted by the clearance between a punch and a die (diametral clearance), the punching direction (whether punched onto the metal plate or onto the elastic member), or by the degree of compression of the elastic member when punched.

Such seal plate 15 as described above is supported by each of both edge portions on the inner surface of the outer race 4 while forcing the outer circumferential elastic projection 19 into the holding groove 14.

In the thus constructed sealed ball bearing of the present invention, the seal plate 15 can be supported by the holding groove 14 without complicating the sectional shape of the holding groove 14 formed on each of both edge portions on the inner surface of the outer race 4 as well as the shape of the outer circumferential elastic projection 19 engaged with the holding groove 14 or without increasing the widths of the holding groove 14 and the outer circumferential elastic projection 19.

As a result, the manufacturing cost can be reduced. In addition, the life of the ball bearing can be increased by increasing the volume of a ball arranging space 8 (FIG. 9) to thereby increase the amount of grease charged into such space 8 in the case where the width of the sealed ball bearing is fixed. Further, if the volume of the space 8 is fixed, the sealed ball bearing can be downsized by decreasing the width thereof.

Experiments done by the inventors will be described in the following description. The experiments are carried out to find out requirements for facilitating the operation of engaging the outer circumferential elastic projection 19 of the seal plate 15 with the holding groove 14 as well as to make the outer circumferential elastic projection 19 hard to come off the holding groove 14 after engaged.

In the experiments, the shape and dimensions of the holding groove 14, and the dimensions, etc. of the outer circumferential elastic projection 19 are changed in order to obtain a force for pressing the outer circumferential elastic projection 19 into the holding groove 14 (plate pressing force) and a force for extracting the once pressed outer circumferential elastic projection 19 from the holding groove 14 (plate releasing force).

Figure 4A:
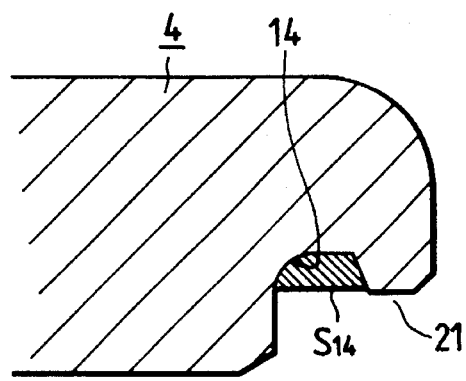
FIGS. 4(a) and 4(b) are sectional views for explaining a relationship between the volume of a holding groove and the volume of an outer circumferential elastic projection.
Figure 4B:
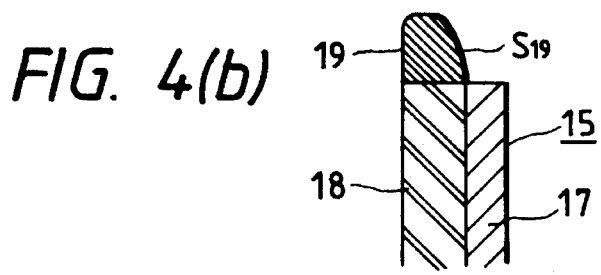

In the experiments, effects of the following factors upon the plate pressing force and the plate releasing force are examined by changing such factors. The factors shown in FIG. 3 are: the inner diameter $D_{14}$ of the mouth portion of the holding groove 14; the depth $d_{14}$ of the holding groove 14; the outer diameter $D_{17}$ of the reinforcing plate 17; the thickness $T_{17}$ of the reinforcing plate 17; the thickness $T_{18}$ of the elastic member 18; the width $W_{14}$ of the holding groove 14; the angle of inclination θ of the mouth portion side inner surface of the holding groove 14; and the elastic constat K of the elastic member 18. The factors shown in FIGS. 4(a) and 4(b) are the volume $S_{19}$ of the outer circumferential elastic projection 19 and the volume $S_{14}$ of the holding groove 14.

Figure 5:
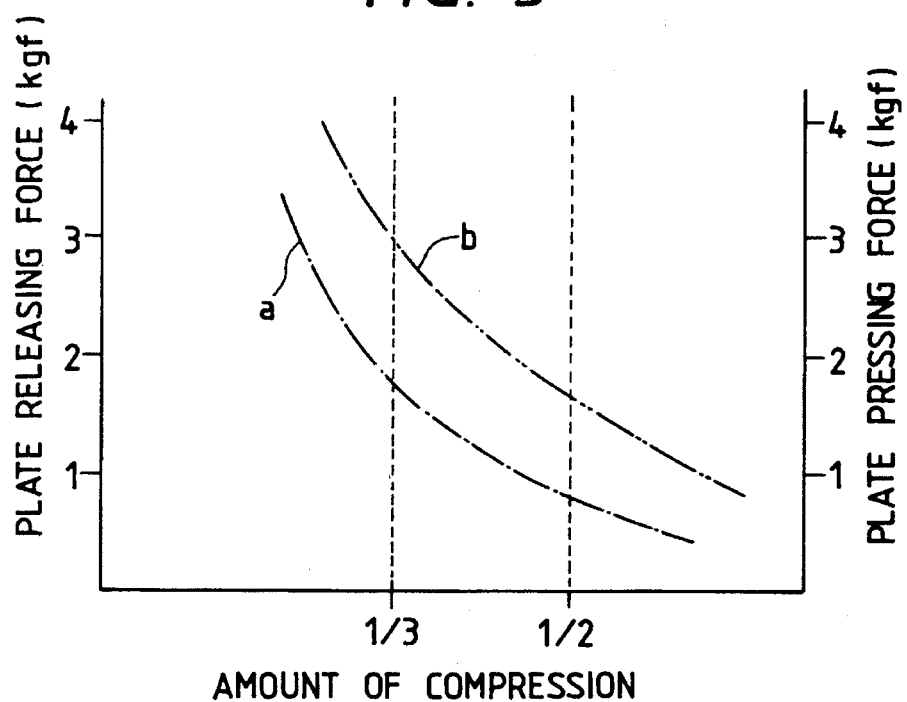
FIG. 5 is a diagram showing effects of the amount of compression of an elastic member upon the plate releasing force and the plate pressing force.

First, in the case where the outer circumferential elastic projection 19 is pressed into the holding groove 14 to thereby project a part of the outer circumferential elastic projection 19 from a clearance 21 between the outer circumferential end portion of the reinforcing plate 17 and the mouth portion of the holding groove 14, the effect of the amount of compression of the elastic member 18 (elastic compression amount), which is a ratio of the width $W_{21}$ of the clearance 21 to the thickness $T_{18}$ of the elastic member 18 ($W_{21}/T_{18}$), upon the plate pressing force and the plate releasing force is obtained from the experiments with a relationship as shown in FIG. 5. The elastic member 18 used in the experiments is composed of nitrile butadiene rubber (NBR) whose elongation percentage is 100 or more.

Out of two curves a, b shown in FIG. 5, curve a indicates a relationship between the elastic compression amount and the plate releasing force, whereas curve b indicates a relationship between the elastic compression amount and the plate pressing force. It is found out from FIG. 5 that the plate releasing force can be increased to a sufficient large value without increasing the plate pressing force so much, as long as the elastic compression amount is maintained within the range of from ⅓ to ½ in the case where the elastic body has an elongation percentage of 100 or more.

Figure 6:
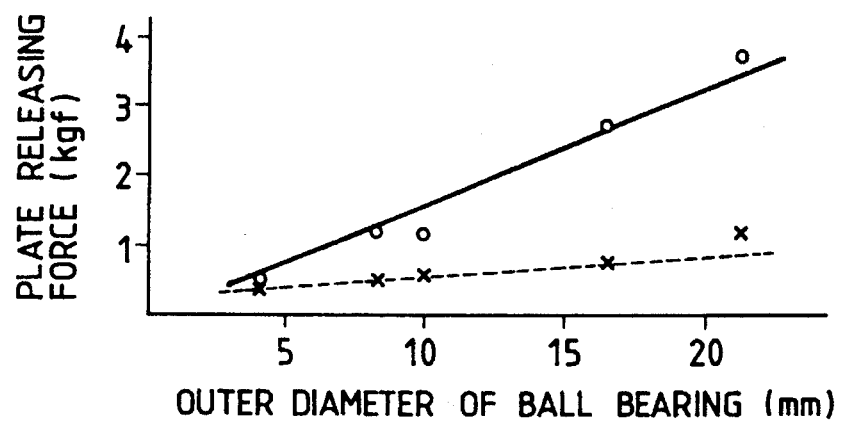
FIG. 6 is a diagram showing a relationship between the outer diameter of the bearing and the plate releasing force.

FIG. 6 shows a relationship between the plate releasing force and the outer diameter of the ball bearing. In obtaining the relationship of FIG. 6, the factors are set to the following values. The elastic member 18 is made from NBR whose elongation percentage is 100 or more. In the case of example 1, when the outer diameter of the bearing is 4.5 mm, the depth $d_{14}$ of the holding groove 14 is set to 0.05 mm; the thickness $T_{17}$ of the reinforcing plate 17, to 0.1 mm; the thickness $T_{18}$ of the elastic member 18, to 0.13 mm; the width $W_{14}$ of the holding groove 14, to 0.2 mm; the angle of inclination $\Gamma$ of the inner side surface of the mouth portion of the holding groove 14, to 10°; and the ratio of the volume $S_{19}$ of the outer circumferential elastic projection 19 to the volume $S_{14}$ of the holding groove 14, $S_{14}/S_{19}$, to 60%. In the case of example 2, the outer diameter of the bearing is set to 9.525 mm; $d_{14}$, to 0.06 mm; $T_{17}$, to 0.1 mm; $T_{18}$, to 0.17 mm; $W_{14}$, to 0.25 mm; $\Gamma$, to 15°; and $S_{14}/S_{19}$, to 60%. Further, in the case of example 3, the outer diameter of the bearing is set to 22 mm; $d_{14}$, to 0.1 mm; $T_{17}$, to 0.15 mm; $T_{18}$, to 0.2 mm; $W_{14}$, to 0.3 mm; $\Gamma$, to 15°; and $S_{14}/S_{19}$, to 60%.

In FIG. 6, the solid line indicates a case of a product according to the present invention, and the broken line, a case of a conventional product. As is apparent from the depiction of FIG. 6, the plate releasing force of the seal plate 15 in the sealed ball bearing of the present invention increases with increasing outer diameter of the ball bearing, compared with the conventional sealed ball bearing. Therefore, even if the outer diameter of the ball bearing is increased, it is not necessary to increase the width $W_{14}$ of the holding groove 14 so much, thus allowing the width of the ball bearing width to be limited.

Figure 7:
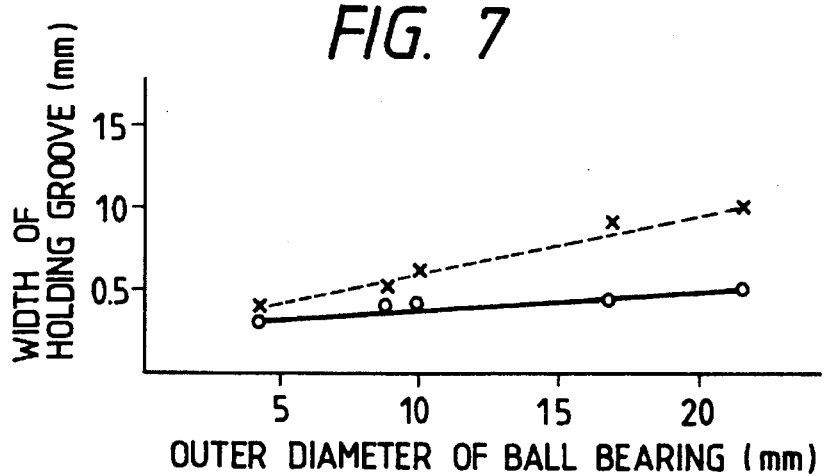
FIG. 7 is a diagram showing a relationship between the outer diameter of the bearing and the width of the holding groove.

FIG. 7 shows a relationship between the outer diameter of the ball bearing and the width $W_{14}$ of the holding groove 14 in examples 1 to 3. In the above embodiments, a plate releasing force of 400 gf or more, a plate releasing force of 1.21 kgf or more, and a plate releasing force of 3.6 kgf or more are recorded in examples 1, 2, 3, respectively. It is understood from FIG. 7 also that the width of the ball bearing can be limited because even if the outer diameter of the ball bearing is increased, it is not necessary to increase the width $W_{14}$ so much. In FIG. 7, the solid line indicates a case of the ball bearing of the present invention, and the broken line, a case of the conventional ball bearing.

The relationship $S_{14}/S_{19}$ between the volume $S_{19}$ of the outer circumferential elastic projection 19 and the volume $S_{14}$ of the holding groove 14 is set within a range of from 0.5 to 0.95, more preferably, within a range of from 0.6 to 0.9.

Figure 8:
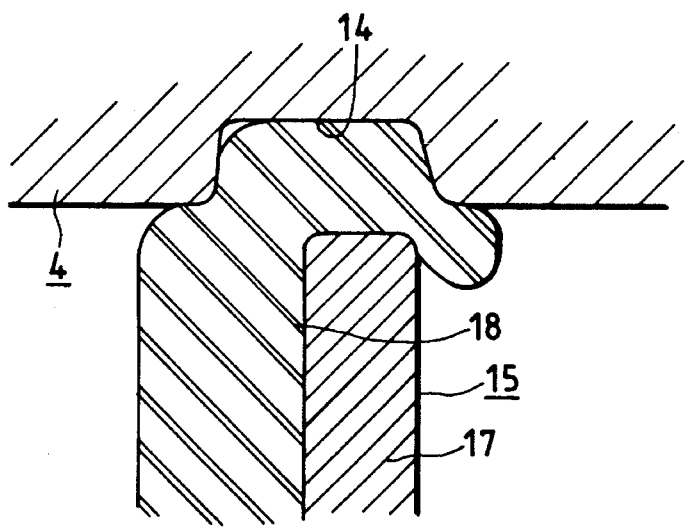
FIG. 8 is a partially sectional view showing another shape of the sealed ball bearing of the present invention.

A stepped portion of the holding groove 14 which is on the side toward the middle of the outer race 4 is not always required in constructing the sealed ball bearing of the present invention as shown in FIGS. 1 and 3. A holding groove 14 of such a shape as shown in, e.g., FIG. 8 may also hold the seal plate 15 adequately.

Further, with the embodiments of the present invention as described above, the holding groove 14 is formed on the edge portion over the inner circumference of the outer race 4. The seal plate 15 is supported by each of both the edge portions on the inner surface of the outer race 4 while forcing the outer circumferential elastic projection 19 into the holding groove 14. However, the holding groove 14 can be formed on an edge portion over the outer circumference of the inner race 2. In the case of such an embodiment, the seal plate 15 is supported by each of both the edge portions on the outer surface of the inner race 2 while forcing the inner circumferential elastic projection 20 into the holding groove 14, so that an inner circumferential end portion of the seal plate 15 is held by the holding groove 14.

Moreover, with the embodiments of the present invention, an exposed surface of the reinforcing plate 17 of the seal plate 15 can be painted in a color (e.g., bright red, blue or the like) distinguishable from the elastic member 18, so that a forcing direction and sides of the seal plate 15 can be distinguishable with ease when the outer circumferential elastic projection 19 is forced into the holding groove 14. The exposed surfaces of a pair of the seal plates 15 in the ball bearing can be painted in colors different from each other, so that a charging direction of the grease can be distinguishable with ease. Such an embodiment is suitable for a ball baring that the charging direction of the grease is regulated.

Since the sealed ball bearing of the present invention is constructed and operated as described above, the structure of a portion at which the seal plate is attached to the surface of the outer race or the inner race can be simplified. This not only allows the seal plate arranging space to be decreased, but also allows the amount of grease charged into a space present within the seal plate to be increased. As a result, not only the life of the ball bearing can be increased, but also the sealed ball bearing can be downsized.

What is claimed is:

1. A sealed ball bearing comprising:

an inner race having an inner raceway track on an outer surface thereof;

an outer race having an outer raceway track on an inner surface thereof and being arranged so as to be concentric with said inner race;

a plurality of balls arranged so as to be rollable between said inner raceway track and said outer raceway track;

at least one holding groove formed on an edge portion of said inner surface of said outer race over an inner circumference of said outer race; and at least one seal plate formed into an annular shape and held by said holding groove, said seal plate including a reinforcing plate and an elastic member bonded on one surface of said reinforcing plate, said elastic member including an outer elastic projection projected at an outer circumferential end portion thereof from an end portion of said reinforcing plate on the side of said outer race, wherein an elongation change ratio of said elastic member is at least 100 percent, wherein a relationship between the volume of said outer elastic projection and the volume of said holding groove is set within a range of 0.5 to 0.9, and wherein a clearance is formed between said outer circumference end portion of said reinforcing plate and said holding groove to project a part of said outer elastic projection from said clearance by forcing said outer elastic projection into said holding groove, a ratio of the width of said clearance to the thickness of said elastic member being maintained within the range of 1/3 to 1/2.

2. The sealed ball bearing of claim 1, wherein said seal plate is supported on said outer race by forcing said outer elastic projection into said holding groove.

3. The sealed ball bearing of claim 1, wherein said elastic member includes an inner elastic projection projected at an inner circumferential end portion thereof from an end portion of said reinforcing plate on the side of said inner race.

4. The sealed ball bearing of claim 1, wherein said outer race includes a stepped portion formed on an edge portion of said inner surface thereof, whose internal diameter is made larger than a middle portion of said outer race.

5. The sealed ball bearing of claim 1, wherein an exposed surface of said reinforcing plate of said seal plate is painted in a color distinguishable from said elastic member.

6. The sealed ball bearing of claim 1, wherein exposed surfaces of a pair of seal plates are painted in colors different from each other.

7. The sealed ball bearing of claim 1, wherein the relationship between the volume of said inner elastic projection and the volume of said holding groove is preferably set within a range of 0.6 to 0.9.

8. A sealed ball bearing comprising:

an inner race having an inner raceway track on an outer surface thereof;

an outer race having an outer raceway track on an inner surface thereof and being arranged so as to be concentric with said inner race;

a plurality of balls arranged so as to be rollable between said inner raceway track and said outer raceway track;

at least one holding groove formed on an edge portion of said inner surface of said outer race over an outer circumference of said inner race; and at least one seal plate formed into an annular shape and held by said holding groove, said seal plate including a reinforcing plate and an elastic member bonded on one surface of said reinforcing plate, said elastic member including an inner elastic projection projected at an inner circumferential end portion thereof from an end portion of said reinforcing plate on the side of said inner race, wherein an elongation change ratio of said elastic member is at least 100 percent, wherein a relationship between the volume of said inner elastic projection and the volume of said holding groove is set within a range of 0.5 to 0.9, and wherein a clearance is formed between said inner circumference end portion of said reinforcing plate and said holding groove to project a part of said outer elastic projection from said clearance by forcing said inner elastic projection into said holding groove, a ratio of the width of said clearance to the thickness of said elastic member being maintained within the range of ⅓ to ½.

9. The sealed ball bearing of claim 8, wherein the relationship between the volume of said inner elastic projection and the volume of said holding groove is preferably set within a range of 0.6 to 0.9.

\* \* \* \* \*

UNITED STATES PATENT AND TRADEMARK OFFICE
CERTIFICATE OF CORRECTION

PATENT NO. : 5,531,525
DATED : July 2, 1996
INVENTOR(S) : Tadayoshi HIDA et al.

It is certified that error appears in the above-indentified patent and that said Letters Patent is hereby corrected as shown below:

Col. 1, line 8, delete "while incorporated into", insert --in--;

line 12, delete "vidual", insert --visual--;

line 21, delete "two positions of";

lines 23 and 24, delete "An annular", insert --Annular--;

line 36, delete "with";

line 49, delete "15", insert --7--;

line 51, delete "18", insert --11;

line 52, delete "17", insert --10--;

lines 57 and 58, delete "hard to come off", insert --difficult to remove--.

Col. 4, line 9, delete "hard to come off", insert --difficult to remove--;

line 10, after "after" insert --being--;

line 29, delete "constat", insert --constant--.

Col. 5, line 1, delete "Γ", insert --$\theta$--;

line 7, delete "Γ", insert --$\theta$--;

line 10, delete "Γ", insert --$\theta$--;

UNITED STATES PATENT AND TRADEMARK OFFICE
CERTIFICATE OF CORRECTION

PATENT NO. : 5,531,525

DATED : July 2, 1996

INVENTOR(S) : Tadayoshi HIDA et al.

It is certified that error appears in the above-indentified patent and that said Letters Patent is hereby corrected as shown below:

Col. 6, line 3, delete "baring", insert --bearing--.

Signed and Sealed this

Tenth Day of June, 1997

Attest:

BRUCE LEHMAN

Attesting Officer

Commissioner of Patents and Trademarks